Dec. 23, 1947. R. H. ZULL 2,433,252
DIRECTION SIGNAL FOR MOTOR VEHICLES
Filed Aug. 6, 1945
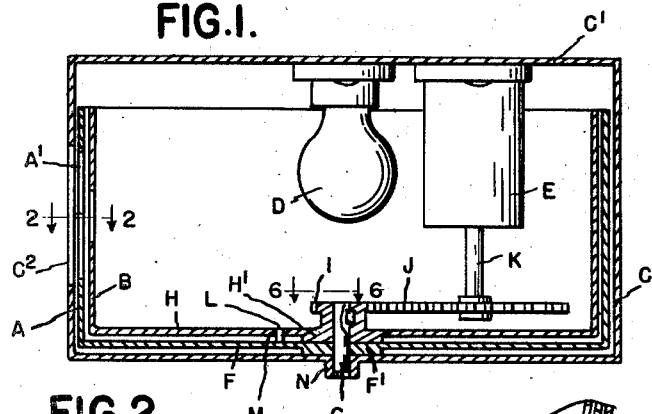
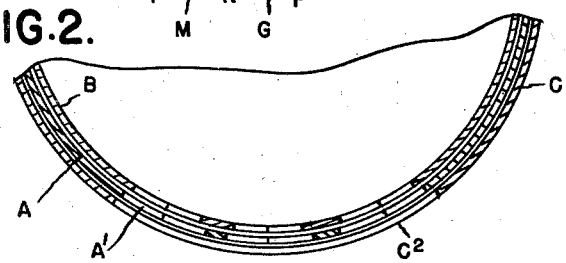
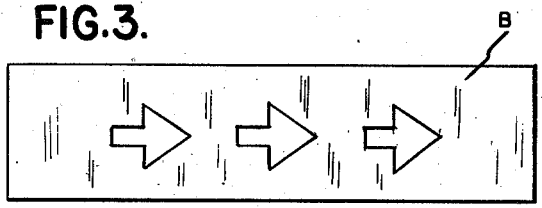
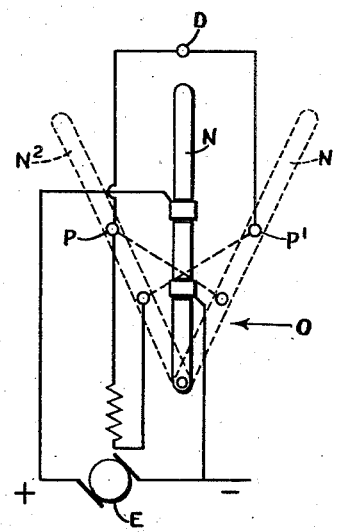
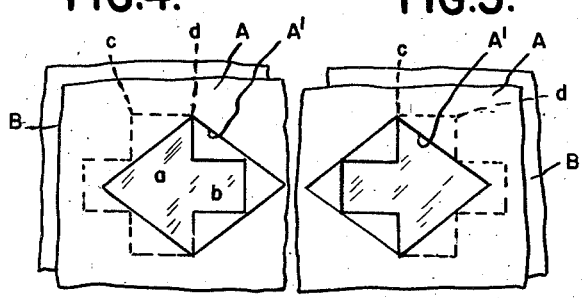
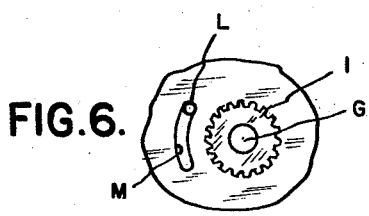
INVENTOR.
RAY H. ZULL
BY
Whittemore Hulbert & Belknap
ATTORNEYS Patented Dec. 23, 1947

2,433,252

UNITED STATES PATENT OFFICE 2,433,252

DIRECTION SIGNAL FOR MOTOR VEHICLES

Ray H. Zull, Detroit, Mich.

Application August 6, 1945, Serial No. 609,117

3 Claims. (Cl. 177—327)

The invention relates to direction signals more particularly designed for use on motor vehicles to indicate the direction in which the vehicle is to be turned.

It is the object of the invention to obtain a construction which will attract the attention of a driver in a following car and will more clearly indicate the intended direction of turning.

It is a further object to obtain a simple construction and with these objects in view the invention consists in the construction as hereinafter set forth.

In the drawings:

Fig. 1 is a central longitudinal section through the direction signal;

Fig. 2 is a horizontal section through a portion of Fig. 1 on line 2—2 thereof;

Fig. 3 is a rear elevation;

Figs. 4 and 5 are fragmentary elevations of the superposed shields relatively arranged to form arrows pointing in opposite directions;

Fig. 6 is a section on line 6—6, Fig. 1, showing the limited lost motion connection between the two shields; and Fig. 7 is a diagrammatic view showing how the signal is controlled by any suitable switch.

It is customary in direction signals to use arrows which are pointed in the direction of an intended turn. With my improved construction I not only point the arrows in the predetermined direction but also cause a succession of arrows thus pointed to travel in the same direction. Such movement can be detected more readily than the form of the signal even where the eyes of the observer are not clearly focused.

Generally described, my improved direction signal comprises a pair of superposed rotatable shields each having a series of window openings therein so fashioned that the registering portions in the two shields will be arrow-shaped. The pointing of these arrows in reverse direction may be accomplished by a predetermined relative movement of the two shields. Such adjustment is automatically effected by the initial movement of one of the shields in either of opposite directions and will point the arrow in the same direction.

With the specific construction illustrated in the drawings, the shields A and B are of cylindrical form arranged one within the other and in close proximity. The shield A is provided with an annular series of diamond-shaped window openings A' therein and the shield B has a similar annular series of window openings which are of cross-shaped contour. As shown in Figs. 4 and 5, the arrows are formed by portions of the windows in the two shields. Thus, in Fig. 4 the lefthand half of the diamond opening in the shield A is unobstructed by any portion of the shield B but the righthand half is partially covered by the contour of the cross-shaped window. The total effect is to leave an unobstructed opening including a triangular head portion $a$ and a central stem portion $b$ forming an arrow pointed towards the left. If, however, the shield B is moved to the right relatively to the shield A from the point $c$ to the point $d$ (Fig. 4), this will change the direction of the arrow which as illustrated in Fig. 5 now points to the right. It is, therefore, apparent that a lost motion connection between the two shields permitting a relative movement thereof equal to the length $c$—$d$ and a positive actuation of the shield B in either of opposite directions will automatically point the arrow in the direction moved.

The cylindrical shields A, B are arranged within a housing C which also contains a lamp D and a reversible electric motor E. The outer cylindrical shield A is mounted on a spider F having a hub portion F' revoluble upon a central pin bearing G. The inner cylindrical shield B is mounted on a spider H having a hub portion H' also revolubly supported on the pin bearing G above the hub F'. The hub H' has a pinion I formed thereon which is in mesh with a gear wheel J on the shaft K of the motor E. Both the motor E and the lamp D are mounted on the top wall C' of the housing C and thus will not interfere with the rotation of the shields within said housing. However, the motor directly drives only the shield B. The shield A is indirectly driven through a lost motion connection between it and the shield B which, as illustrated in Figs. 1 and 6, is arranged adjacent to the hubs F' and H' and consists of a pin L attached to the one engaging a segmental slot M in the other. The hub F' rests upon a supporting bearing N surrounding the pin G which causes sufficient frictional resistance to hold the shield A stationary during initial movement of the shield B and until the lost motion is taken up. Thereafter both shields will rotate together in the same direction. The housing C has its rear cylindrical wall cut away to form an opening $C^2$ through which a plurality of window openings in the shields may be simultaneously observed.

The signal is controlled by any suitable means, such as diagrammatically indicated in Fig. 7, in which a lever N mechanically operates a reversing switch O for the motor E. Normally the lever N is in vertical position at which time the switch O is open. When the lever is moved to the right, as at N', the switch O is closed to operate the motor E so as to drive it in a direction which will rotate the shields to the right as viewed in Fig. 3. On the other hand, a movement of the lever N to the left into the position N² will operate the switch to drive the motor E in the reverse direction, which will rotate the shields to the left as viewed in Fig. 3. The lever N also controls the lamp circuit which is open in the neutral position of said lever but is closed by contacts P and P' when the lever is in either of the positions N' and N².

In operation, the driver intending to turn to the right will move the lever N in this direction which will start the motor E rotating the shields to the right as viewed from a position in rear of the vehicle. The initial movement will take up the lost motion between the shields and point all of the arrows to the right, which arrows, however, rotate with the cylinder in endless succession. If, on the other hand, the driver intends to turn to the left, he moves the lever N to the position N² which rotates the shields to the left as viewed in Fig. 3 and during initial movement changes the direction of the arrows to point towards the left. The restoration of the lever N to neutral position may either be manually or automatically effected but the means for the latter forms no part of the instant invention.

What I claim as my invention is:

1. In a direction signal, a pair of concentric cylindrical shields each having an endless series of window openings therein the openings in the one being diamond-shaped and those in the other being cross-shaped, a reversible motor for rotating one of said shields alternatively in opposite directions, a lost motion driving connection between said shields, a lamp within said shields for illuminating said window openings, and operator controlled means for said motor and said lamp, whereby the initial movement of the directly driven shield will take up the lost motion and form of the unobstructed registering portions of said openings arrows pointing in the direction of rotation.

2. In a direction signal, a pair of superposed rotatable shields each having a series of window openings therein, the openings of one series being diamond-shaped and those of the other series being cross-shaped, operator controlled means for rotating one of said shields alternatively in opposite directions, a lost motion connection between said shields, and means for illuminating said window openings, whereby the initial movement of the directly rotated shield in taking up the lost motion between the same and the other shield will relatively shift said shields to form of the unobstructed registering portions of each window opening an arrowhead and stem pointing in the direction of rotation.

3. A direction signal comprising a cylindrical casing having a window opening in one side thereof, a pair of concentric cylindrical shields rotatably supported within said casing, each shield having an endless series of window openings therein, the openings in the one being diamond-shaped and those in the other being cross-shaped, a reversible motor and a lamp within said casing, a transmission between said motor and one of said shields through which the latter can be directly driven alternatively in opposite directions, a lost motion connection between the directly driven shield and the other shield whereby the initial movement of the former will shift the same relative to the latter to form of the unobstructed registering portions of said window openings arrows pointing in the direction of rotation and means for controlling said motor and lamp whereby the lamp is illuminated only when said motor is in operation.

RAY H. ZULL.

REFERENCES CITED

The following references are of record in the file of this patent:

UNITED STATES PATENTS

| Number | Name | Date |
|---|---|---|
| 1,313,346 | Smith | Aug. 19, 1919 |
| 1,623,880 | Marsik | Apr. 5, 1927 |
| 1,674,022 | Schairer | June 19, 1928 |
| 1,828,119 | Miller | Oct. 20, 1931 |
| 1,976,213 | Briechle et al. | Oct. 9, 1934 |
| 2,097,056 | Briechle | Oct. 26, 1937 |